Aug. 17, 1937.  A. NAGEL  2,090,063
FOCUSING AUTOMATICALLY ERECTING FRONT CAMERA
Filed March 3, 1936  3 Sheets-Sheet 1

August Nagel, INVENTOR:

BY

ATTORNEYS.

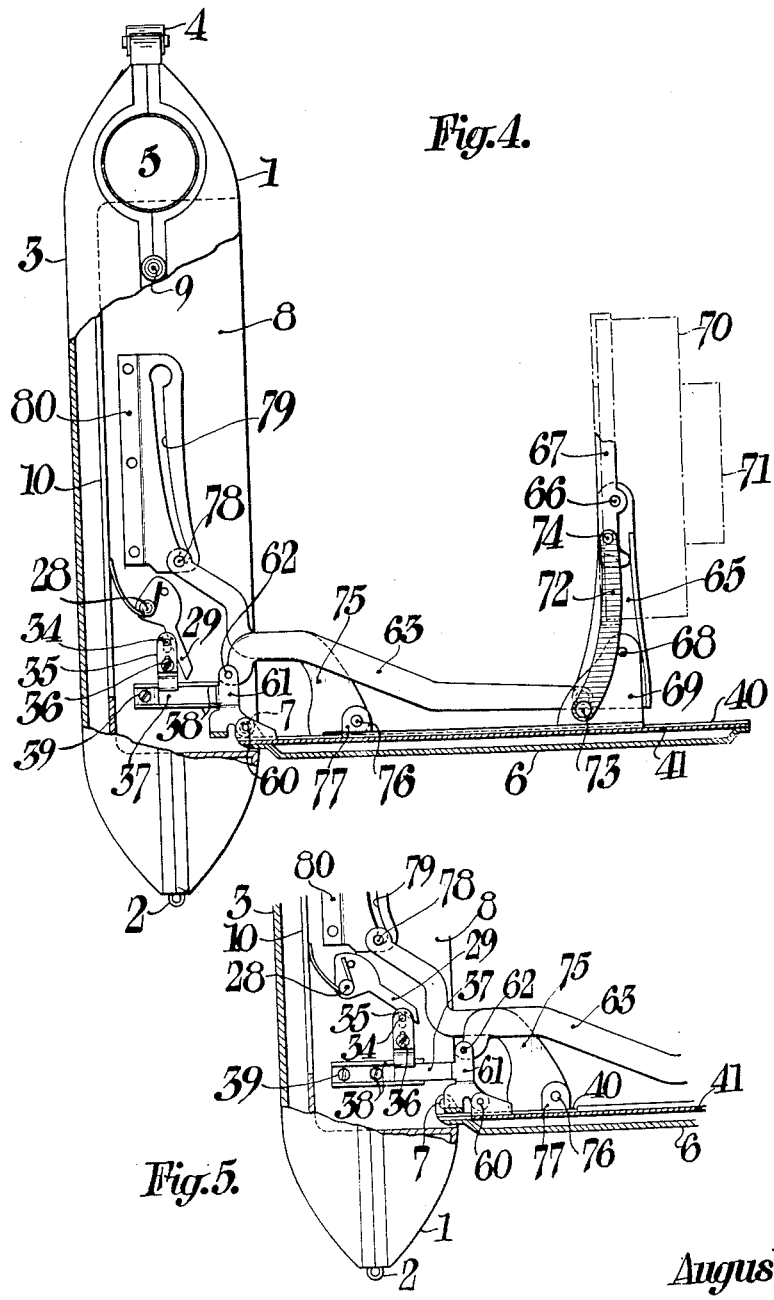

Aug. 17, 1937.  A. NAGEL  2,090,063
FOCUSING AUTOMATICALLY ERECTING FRONT CAMERA
Filed March 3, 1936  3 Sheets-Sheet 3

August Nagel,
INVENTOR:

BY
ATTORNEYS.

Patented Aug. 17, 1937

2,090,063

UNITED STATES PATENT OFFICE

2,090,063

FOCUSING AUTOMATICALLY ERECTING FRONT CAMERA

August Nagel, Stuttgart, Germany, assignor, by mesne assignments, to Eastman Kodak Company, Jersey City, N. J., a corporation of New Jersey Application March 3, 1936, Serial No. 66,847
In Germany July 30, 1934

12 Claims. (Cl. 95—44)

This invention relates to photography and more particularly to photographic cameras. One object of my invention is to provide a camera which is relatively compact and which will totally enclose a range finder mechanism. Another object of my invention is to provide a camera of the self-erecting front type in which a part of the mechanism cooperates with a movable element of a range finder mechanism to indicate the focus of the camera objective. Another object of my invention is to provide a camera of the self-erecting front type with a rigid front or extension upon which a slidable member is mounted to carry the self-erecting front mechanism to which there may be attached a hinged link or slide for operating a range finder carried in the camera body. Another object of my invention is to provide a camera with curved walls, one of which is provided with a recess for receiving a range finder which is substantially concealed therein, and other objects will appear from the following specification, the novel features being particularly pointed out in the claims at the end thereof.

Coming now to the drawings wherein like reference characters denote like parts throughout—

Fig. 4 is an enlarged side elevation partially in section of the camera shown in the preceding figures.

Fig. 5 is a fragmentary detail of a portion of the camera shown in Fig. 4, but with the focusing slide and accompanying mechanism in a different position.

Figure 1:
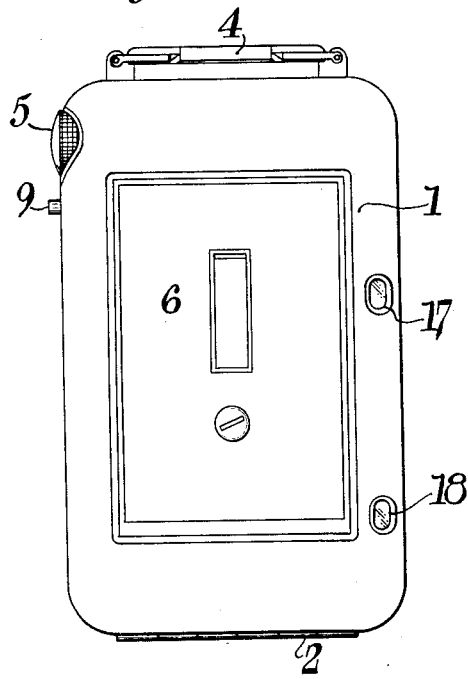
Fig. 1 is a front plan view of a camera constructed in accordance with and embodying a preferred form of my invention.
Figure 2:
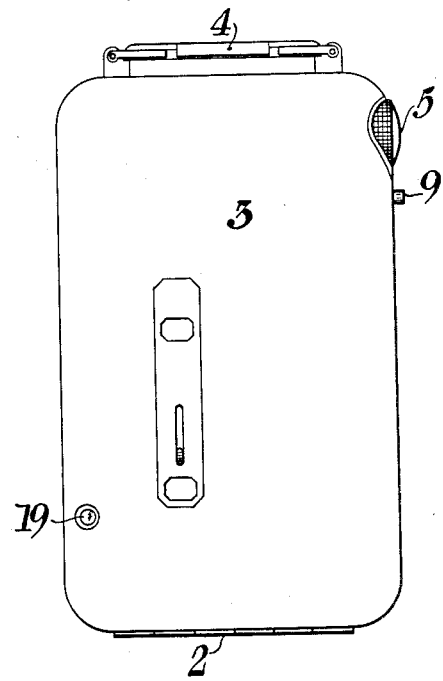
Fig. 2 is a rear plan view of the camera shown in Fig. 1.

As indicated in Figs. 1 and 2, the camera may consist of a camera body 1 to which there is hinged at 2 a camera back 3. The usual handle 4 may be provided at one end and a winding key 5 may be partially swung into a recess in a side wall, from which it may be withdrawn to facilitate winding a film through the camera.

The camera is provided with a bed 6 which is hingedly attached at 7 to the insides of the side walls 8 of the camera, as best shown in Figs. 4 and 5. This bed is adapted to move from the closed position shown in Fig. 1 to the open position shown in Fig. 4 when it is released by pressing a button 9 on the camera which actuates a latch mechanism, not shown.

Figure 3:
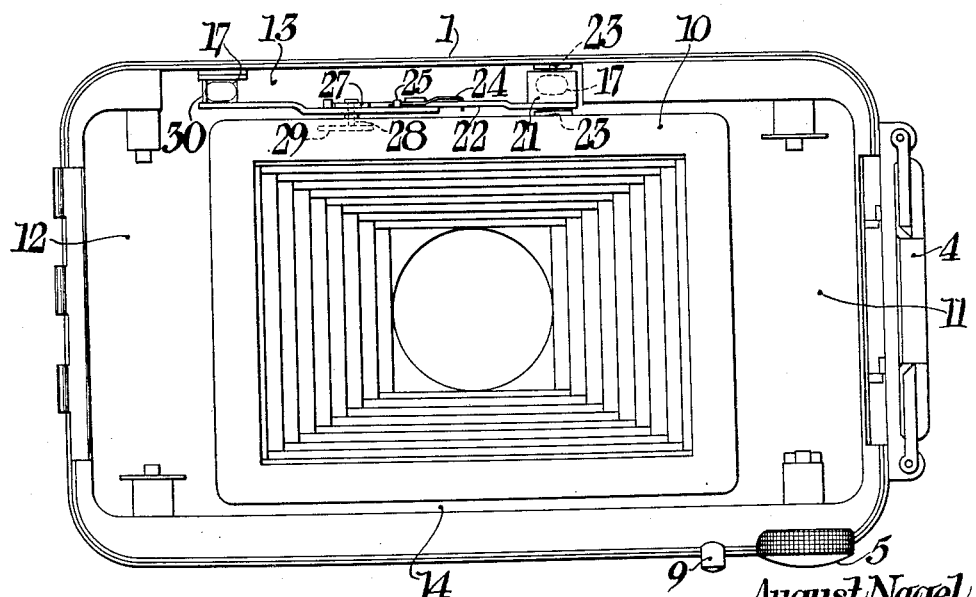
Fig. 3 is an enlarged rear plan view of the camera shown in the preceding figures but with the camera back removed to show the interior construction of the camera.
Figure 6:
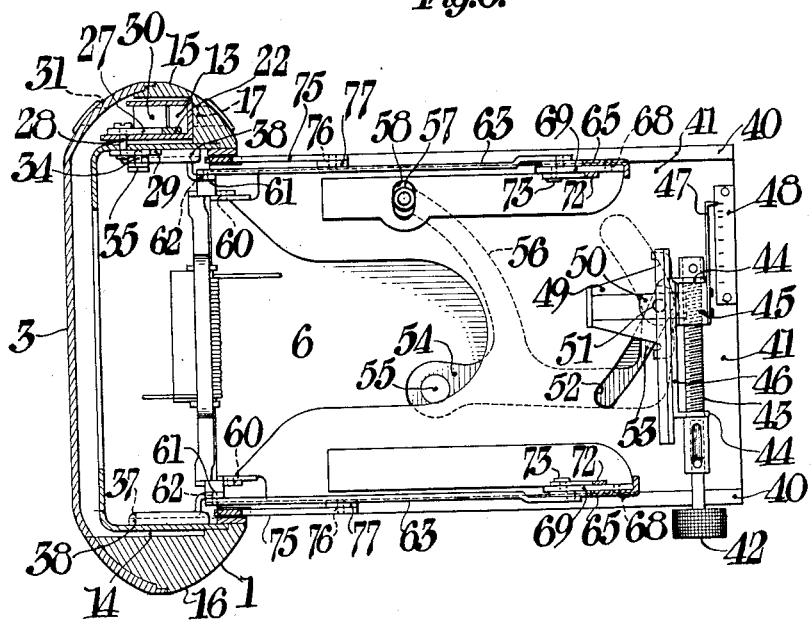
Fig. 6 is a top plan view partially in section showing the camera bed with the casing covering the focusing mechanism removed to show the relation of the various parts.

The camera body 1 is preferably provided, as shown in Fig. 3, with an exposure frame 10 which extends upwardly from the inside wall of the camera body so as to leave spoon chambers 11 and 12 to either end of the exposure frame 10 and to leave open spaces or recesses 13 and 14 on the longitudinal sides of the exposure frame, these recesses being formed between the curved outside wall portions 15 and 16, as best shown in Fig. 6. Thus, the camera body is provided with walls which are either rounded at their lateral edges or taper off towards the extreme edges of the camera body so that a "stream-lined" or smooth exterior wall is provided on the camera.

In one of these recesses, here shown as 13, I prefer to mount a range finder mechanism in such a way that the front of the camera needs only two small windows 17 and 18, and the rear wall of the camera needs only a single sight opening 19, except for which the range finder is completely concealed inside of the camera body.

Figure 7:
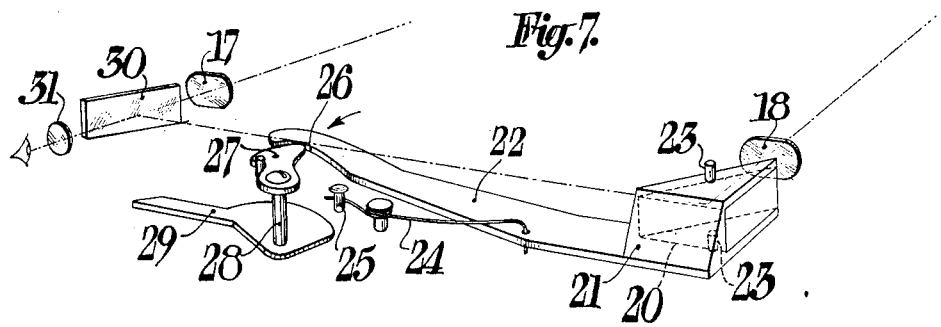
Fig. 7 is an enlarged schematic perspective view of the range finder removed from the camera body.

The range finder preferably consists, as shown in Fig. 7, of a pair of windows 17 and 18, behind one of which—18—there is mounted a prism 20. This prism is carried by a block 21 on the lever 22 which is pivoted to turn upon the trunnions 23 when moved by the arm 22. A spring 24 engaging the arm and a pin 25 tends to turn the arm in the direction shown by the arrow, in which a cam surface 26 is in contact with a cam 27 carried by a shaft 28 which may be oscillated by the lever arm 29, as will be hereinafter more fully described.

Behind the window 17 there is a mirror 30 which is rendered semi-transparent as by a thin coating of platinum. Behind the mirror 30 is an eye-piece 31. This type of range finder is well known, it being the type that images are brought into registration on the mirror 30 by moving the prism 20 until the principal object focused upon is in focus for the setting of the camera objective. When this occurs, the two images will be in registration.

In order to move the lever 29, the mechanism shown in Figs. 4 and 5 is employed. The lever 29 projects downwardly into the path of a pin 34 which is carried on a slide 35, preferably adjustable by means of the screw 36 on a supporting arm which lies directly beneath it. Arm 35 is carried by a slide member 37 which can move between two rails 38, these rails being attached as by screws 39 to the side walls 3 of the camera. Thus, when the slide 37 moves in the rails 38 the lever 29 is rocked so that the prism 20 will be moved as the camera is focused.

This focusing movement is accomplished, as indicated in Fig. 6, in the following manner. The camera bed 6 is provided with a pair of longitudinally extending grooved side rails 40 into which a slidable member 41 fits, this slidable member being adapted to move longitudinally with respect to the camera bed 6. This movement may be accomplished by means of a hand wheel 42 which is attached to a shaft carrying a screw 43, the shaft being mounted to revolve in bearings 44. On the screw member 43 is a nut 45 adapted to travel along the screw, being guided by a bracket 46. The nut 45 carries an arm 47 adapted to register the focal point on a scale 48.

As the screw 44 moves, it carries with it a yoke 49 which embraces the sides of a slidable member 50 carrying a pin 51 which extends downwardly through the slot 52, and which is carried by one arm 53 of a bell-crank lever 54, pivoted at 55 to the camera bed 6 and having a second arm 56 carrying a stud 57 adapted to engage the side walls 58 of a slot carried by a portion of the slide 41.

Thus, as the screw moves the nut 44, the bell-crank lever 54 swings upon its pivot 55, moving the slide 41 in the rails 40. This focusing movement is transmitted to the arm 35 in the following manner. The slide 41 is hingedly attached at 60 to a bracket 61 which likewise supports a hinge pintle 62 carrying the side arms 63. Thus, as the slide 41 moves on the camera bed 6, the bracket 37 moves with it, and the movable prism 20 is adjusted.

The reason for the hinge 60 is that when the camera is in a position to fold, as is indicated in Fig. 4, the bed may be folded about its hinge pintle 7 and at the same time the hinge pintle 60 permits the slide and the bracket 61 to move relative to each other so that the camera may fold.

The link 63 is one of the links which forms a part of the self-erecting front mechanism which comprises, in part, a pair of front standards 65 carrying pivots 66 for supporting a lens board 67, the standards 65 being also pivoted at 68 to the brackets 69, carried by the slide 40. The front board 67 may carry the usual shutter 70, and the front lens cell 71 may be attached to the shutter in the usual manner. A link 72 is pivotally attached at 73 to the bracket 69 and is pivotally attached at 74 to the lens board to guide the shutter and objective in its folding movement.

In order to hold the bed 6 in an open or picture-taking position with sufficient rigidity, I provide bed braces 75 which are pivotally attached at 76 to the camera bed bracket 77 and which are provided with studs 78 adapted to slide in slots 79 of the brackets 80 carried on the inside of the side walls of the camera.

Thus, the self-erecting front mechanism is entirely carried by the slide 41 which may move in the rails 40 of the camera bed, and the movement transmitted to the slide 41 through the pin 34 rocks lever 29 and with it the prism 20 for indicating when the camera is properly focused.

With a construction as above described the range finder, comparatively inconspicuous and being concealed beneath a curved wall of one side of the camera, adds but little to the total width of the camera.

What I claim is:

1. In a camera of the folding type including a camera body having outside walls, a hinged bed, and a camera front moveable thereover for focusing, the combination with an exposure frame, of a camera body considerably wider than the exposure frame, and having a wall curved in cross section forming a recess inside of the outside walls of the camera and located to one side of the exposure frame, range finder elements mounted in said recess, having sight openings extending therethrough said curved wall.

2. In a camera of the folding type, the combination with a camera body including curved walls surrounding an exposure frame, of range finder elements mounted between the bellows frame and a curved wall, the curved wall being provided with sight openings permitting light rays to pass to and from the range finder.

3. In a camera of the folding type, the combination with a camera body including curved walls surrounding an exposure frame, of range finder elements mounted between the bellows frame and a curved wall, sight openings provided in the curved wall permitting light rays to pass to and from the range finder elements, a movable mount for one range finder element extending through a wall into the camera body, a focusing means including parts movable on the camera body, and connections between said parts movable on the camera body and the movable mount for moving the latter from the former.

4. In a camera, the combination with a camera body including a bellows chamber, an exposure frame at one end thereof, camera walls extending from the opposite ends of the exposure frame at least portions of which curve upwardly and away from the bellows frame whereby spool chambers are formed opposite two sides of the bellows frame, and chambers are formed on the sides of the bellows frame between the spool chambers, a back for said camera body with inwardly curving edges adapted to contact and form a light tight joint with the curved walls of the camera body, and range finder elements carried in the camera body between the curved walls of the camera body and back and a portion of the bellows frame.

5. In a camera the combination with a camera body including a bellows chamber, an exposure frame at one end thereof, camera walls extending from the opposite ends of the exposure frame at least portions of which curve upwardly and away from the bellows frame whereby spool chambers are formed opposite two sides of the bellows frame, and chambers are formed on the sides of the bellows frame between the spool chambers, range finder elements being mounted in one of said chambers.

6. In a camera the combination with a camera body including a bellows chamber, an exposure frame at one end thereof, camera walls extending from the opposite ends of the exposure frame at least portions of which curve upwardly and away from the bellows frame whereby spool chambers are formed opposite two sides of the bellows frame, and chambers are formed on the sides of the bellows frame between the spool chambers, a back for said camera body with inwardly curving edges adapted to contact and form a light tight joint with the curved walls of the camera body, and range finder elements carried in the camera body between the curved walls of the camera body and back and a portion of the bellows frame and concealed beneath the curved wall thereof, having sight apertures therein the curved walls in predetermined relationship to said range finder elements.

7. In a camera the combination with a camera body including a bellows chamber, an exposure frame at one end thereof, camera walls extending from the opposite ends of the exposure frame at least portions of which curve upwardly and away from the bellows frame whereby spool chambers are formed opposite two sides of the bellows frame, and chambers are formed on the sides of the bellows frame between the spool chambers, a back for said camera body with inwardly curving edges adapted to contact and form a light tight joint with the curved walls of the camera body, range finder elements carried in the camera body between the curved walls of the camera body and back and a portion of the bellows frame and concealed beneath the curved wall thereof, the curved walls having sight apertures therein in predetermined relationship to said range finder elements, and a back adapted to fit on the body and having walls forming a light tight connection with the walls thereof.

8. In a camera, the combination, with a camera body, of a bed hingedly attached thereto, braces for holding the bed in an open position, a camera front adapted to be projected into a picture taking position over the bed, a self-erecting front mechanism for projecting the camera front, means for focusing said camera front including a slide carried partially by the camera body, and partially by the camera bed and mounted to slide on the camera body and bed, means carried by the camera body for engaging and moving with said slide, a range finder mounted on the camera body of a type including a movable reflector, and means for operating the movable reflector from the means for engaging and moving with the slide whereby the range finder and focusing movements are correlated.

9. In a camera, the combination, with a camera body, of a bed hingedly attached thereto, braces for holding the bed in an open position, a camera front adapted to be projected into a picture taking position over the bed, a self-erecting front mechanism for projecting the camera front, means for focusing said camera front including a slide carried partially by the camera body and partially by the camera bed and mounted to slide on the camera body and bed, a pivoted member spring pressed into engagement with the slide and adapted to be moved thereby, means for adjusting the pivoted member and slide to vary their effective contact, a range finder mounted on the camera body of a type including a movable reflector, and means for operating the movable reflector from the means for engaging and moving with the slide whereby the range finder and focusing movements are correlated.

10. In a camera, the combination, with a camera body, of a bed hingedly attached thereto, braces for holding the bed in an open position, a camera front adapted to be projected into a picture taking position over the bed, a self-erecting front mechanism for projecting the camera front, means for focusing said camera front including a slide carried partially by the camera body and partially by the camera bed and mounted to slide on the camera body and bed, a pivotally mounted member carried by the camera body and spring pressed toward the slide, an adjustable member mounted on the slide to move to and from the pivotally mounted member to change the operative relationship of the pivotally mounted member and slide, a range finder including a movable member carried by the camera body, a cam contacting with said movable range finder element, and means for moving said cam through said pivotally mounted member and said focusing slide.

11. In a camera of the folding type, the combination with a camera body, of a bed hingedly mounted thereon, a camera front mounted to move relatively to the bed, a slide movably mounted on the bed and carrying at least part of the camera front, a hingedly mounted slide section adapted to slide on the camera body when the slide is moved on the camera bed for focusing, a range finder including a movable member carried by the camera body, and operative connections between the hinged section and the movable range finder section for transmitting motion from the former to the latter when the camera is focused by moving the slide on the bed.

12. In a camera of the folding type, the combination with a camera body, of a bed hingedly mounted thereon, a camera front mounted to move relatively to the bed, a slide movably mounted on the bed and carrying at least part of the camera front, a hingedly mounted slide section adapted to slide on the camera body when the slide is moved on the camera bed for focusing, a range finder including a movable member carried by the camera body, and operative connections between the hinged section and the movable range finder section for transmitting motion from the former to the latter when the camera is focused by moving the slide on the bed, said operative connections comprising a shaft operating lever, a shaft passing through a wall of the camera, and a cam on the shaft, said cam contacting with and moving the movably mounted range finder element.

AUGUST NAGEL.

CERTIFICATE OF CORRECTION.

Patent No. 2,090,063. August 17, 1937.

AUGUST NAGEL.

It is hereby certified that error appears in the printed specification of the above numbered patent requiring correction as follows: Page 2, second column, line 19, claim 1, strike out the words "said curved wall" and insert the same before "having", line 18, same claim; page 3, first column, line 9, claim 6, strike out the words "the curved walls" and insert the same before "having", line 8, same claim; and that the said Letters Patent should be read with these corrections therein that the same may conform to the record of the Patent Office.

Signed and sealed this 12th day of October, A. D. 1937.

(Seal)

Henry Van Arsdale.
Acting Commissioner of Patents.